Dec. 23, 1958     F. M. LE COMPTE     2,865,654
AUTOMOBILE FENDER FLAP AND SUPPORTING CLAMP
Filed June 17, 1955     2 Sheets-Sheet 1
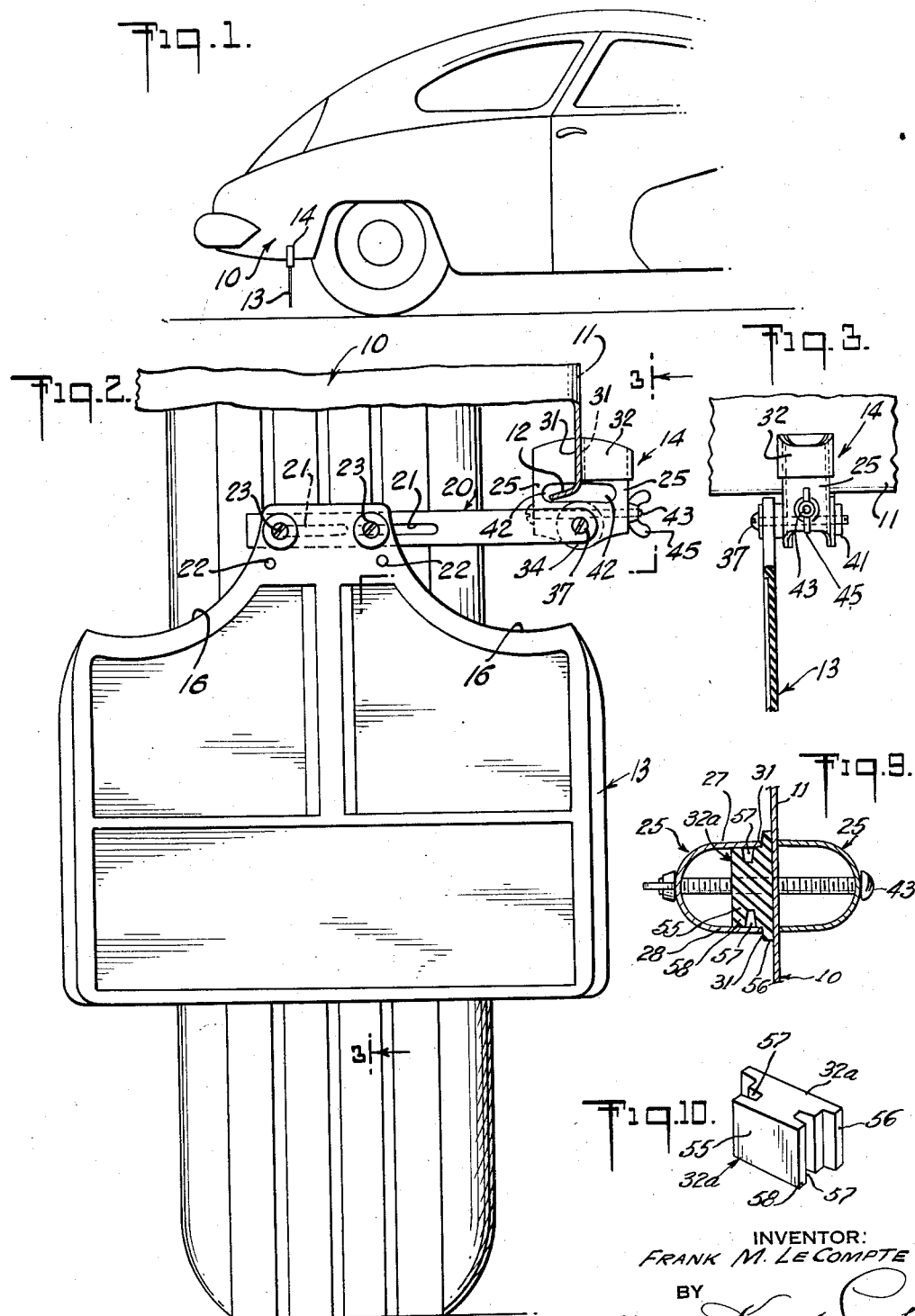
INVENTOR:
FRANK M. LE COMPTE
BY
ATTORNEYS.

Dec. 23, 1958 F. M. LE COMPTE 2,865,654
AUTOMOBILE FENDER FLAP AND SUPPORTING CLAMP
Filed June 17, 1955 2 Sheets-Sheet 2
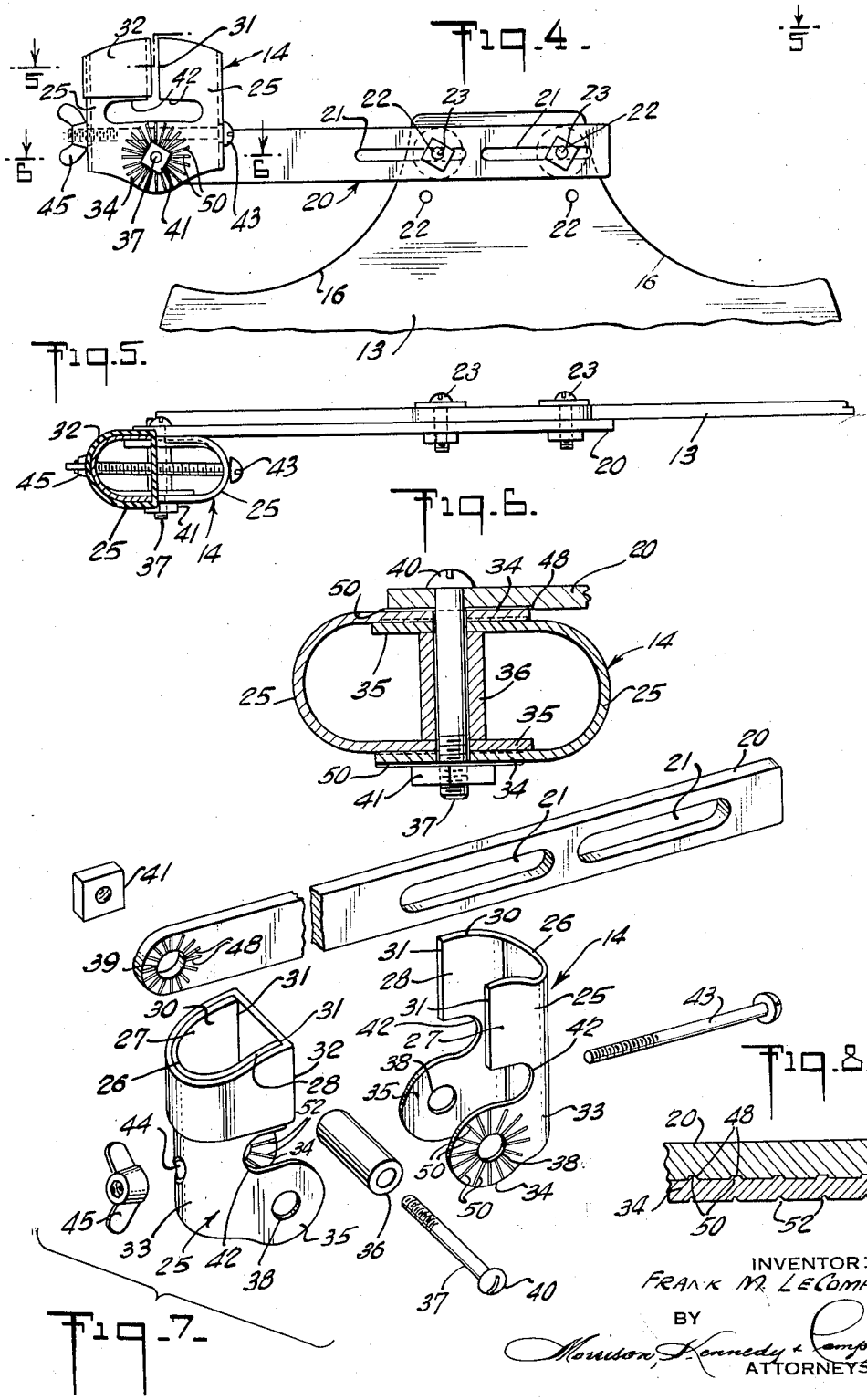
INVENTOR:
FRANK M. LECOMPTE
BY
Morrison, Kennedy & Campbell
ATTORNEYS United States Patent Office 2,865,654
Patented Dec. 23, 1958

2,865,654

AUTOMOBILE FENDER FLAP AND SUPPORTING CLAMP

Frank M. Le Compte, Cranford, N. J., assignor to Tingley Rubber Corporation, a corporation of New Jersey Application June 17, 1955, Serial No. 516,095

11 Claims. (Cl. 280—154.5)

The present invention relates to automobile fender flaps and to supporting clamps therefor and, more particularly, to that type of fender flap and supporting clamp adapted to be attached to the fender of an automobile to protect the sides of the fender and the back or front of the car from mud, gravel, tar and oil.

At the present time, the rear ends of the rear fenders of popular makes of cars follow one general design pattern and the front ends of the front fenders follow a similar design pattern. These fenders in one group all have a substantially vertical side wall disposed in a plane which extends fore-and-aft along the car and inwardly turned flanges or ribs differing in specific design in accordance with three or four general patterns. For example, in some specific designs, the flange is in the form of a narrow rim or in the form of a bead, while in others, it may be wide and have different degrees of general inclination and different degrees of curvature.

Fender flap supporting devices of universal construction for attachment to the side wall and inward flange of a fender of any one of the several different standard designs have been proposed. Such prior devices comprise a clamp and a supporting structure in the form of an arm or bracket designed to be secured to the fender flap. In one prior construction of this type, to permit adjustments for the accommodation of fenders of different standard designs, the supporting structure is in the form of an arcuate arm and the fender flap has a curved guide for said arm. In this prior construction, the clamp consists either essentially of a U-frame rigid with the arcuate supporting arm, or comprises a pair of opposed dissimilar jaws affixed as a unit to the arm against angular movement. These prior art devices are comparatively complicated and expensive, and adjustments are limited to those permitted by the movement of the arcuate supporting arm along the curved guide on the fender flap.

In another prior construction of the general type described, the supporting structure is in the form of a long straight arm but with an arcuately curved end offset and the clamp consists essentially of a U-frame engaging said offset and adjustable therealong to vary the angularity of the clamp in relation to the arm. Here again, the supporting structure is somewhat of special form with its arcuately curved end offset, and the adjustments permitted in the position and angularity of the clamp are limited by the extent to which the clamp may be shifted along the arcuate offset end of the supporting arm.

Among the objects of the present invention are to provide a new and improved supporting clamp device for an automobile fender flap, which is comparatively simple and inexpensive to manufacture, which can be easily and quickly assembled, which can be easily and quickly adjusted to accommodate fenders of different standard design, which affords a wide range of adjustments to accommodate fenders of different standard design, and which has new and improved means for locking the clamp in adjusted position in relation to its supporting structure.

In accordance with certain features of the present invention, the supporting structure for the clamp is in the form of a simple flat straight arm, which may be stamped from simple sheet stock. The clamp comprises a pair of similar interchangeable jaws, made from flat sheet stock and having a simple pivotal connection with one end of the straight arm, permitting the clamp to be adjusted at any one of a number of angles within the range of 360°, in relation to said arm.

As a further feature, the clamp is locked in adjusted angular position in relation to the supporting arm by means of simple interlocking conformations between the clamp and the supporting structure around the pivot connection. In a specific embodiment of this feature, the supporting structure in the form of an arm has its outer end formed with a series of locking linear conformations radiating from a hole through which the bolt or pin for supporting the clamp thereon is adapted to extend, and the clamp has locking conformations complementing the conformations on said arm and radiating from a hole on said clamp through which said bolt or pin is adapted to extend. The two sets of locking conformations on the supporting arm and on the clamp respectively are adapted to mesh and mate and, to that end, one set of conformations desirably consists of grooves, while the other set of conformations desirably consists of ribs designed to fit into said grooves, respectively. These interlockable conformations are desirably stamped into the respective parts of the clamp device. By loosening the nut on the pivot pin or bolt, the parts of the clamp device carrying the interlocking conformations may be separated sufficiently to permit the clamp to be turned for adjustment about the pivot pin. By tightening the nut, the clamp is secured to the supporting bracket, and the interlocking conformations are brought together into positive mesh, preventing angular displacement of the clamp about the pivot pin.

Various other objects, features and advantages of the invention are apparent from the following particular description and from an inspection of the accompanying drawings, in which Fig. 1 is a side elevation of a rear portion of an automobile, showing a form of improved clamp and flap device attached to a rear fender and showing in connection with said clamp device, protective means in the form of a resilient sleeve by which the outer finished face of the side wall of the fender to which said clamp device is attached is protected against scratching or other defacement;

Fig. 2 is a vertical view through a portion of an automobile fender, just rearwardly of the right rear wheel, showing the improved clamp device attached thereto and a fender flap supported thereby;

Fig. 3 is a vertical section of the clamp device and fender taken on lines 3—3 of Fig. 2;

Fig. 4 is a rear view of the clamp device and fender flap supported thereby;

Fig. 5 is a top plan and sectional view of the clamp device and fender flap supported thereby taken on lines 5—5 of Fig. 4;

Fig. 6 is a section of the clamp device taken on lines 6—6 of Fig. 4 but shown on a larger scale;

Fig. 7 is an exploded view in perspective of the clamp device and flap supporting arm;

Fig. 8 is a section on an enlarged scale showing the interlocking conformations between the supporting arm and the clamp;

Fig. 9 is a detail section of the clamp device showing in connection with said clamp device, protective means in the form of a cushioning insert by which the outer finished face of the side wall of the fender to which said clamp device is attached, is protected against scratching or other defacement; and Fig. 10 is a perspective of the resilient protective insert shown in Fig. 9.

Referring to Figs. 1, 2 and 3 of the drawings, there is shown a conventional automobile having a rear fender 10, the rear section of the fender beyond the corresponding right rear wheel having an upstanding side wall section 11 and an inturned flange 12 along the lower edge. The clamp device of the present invention is shown applied to this rear fender on one side of the automobile, but it must be understood that it may also be applied to the front fender and that a similar clamp is employed for the fender or fenders on the other side of the automobile.

A fender flap 13 is adapted to be suspended from the fender through a clamp 14 attachable to the side wall section 11 and to the inturned flange 12 of this fender, in a manner to be described.

The fender flap 13 is desirably of generally rectangular form and made of suitable resilient or plastic material, such as rubber, and has its two upper corners provided with recesses 16 to clear the lower edges of the fender 10 and to permit said fender flap to be located in proper position with respect to the tires, as shown in Fig. 2. Two similar recesses 16 are provided in each flap 13, in order to permit one flap to be used interchangeably for either the left or the right side of the car.

The device shown in Figs. 1 to 8 for supporting the fender flap 13 from the fender of the car comprises the clamp 14 and a supporting structure or bracket 20 therefor in the form of a straight flat arm. For adjustably securing the fender flap 13 to the arm 20, said arm has a pair of elongated slots 21 extending lengthwise thereof and the flap has at its upper reduced end two horizontally spaced sets of round holes 22, adapted to receive bolts 23 passing through the slots 21 in the arm. By providing two horizontally spaced sets of holes 22 as described, instead of two single horizontally spaced holes, the angles of the arm 20 with respect to the fender flap 13 may be adjusted into either the horizontal position shown in Figs. 2 and 4 or into either of two angular positions by selection of the proper pair of diagonally located holes 22 in the two sets.

The arm 20 may be mounted into horizontal position or into different angular positions in relation to the fender flap 13, as described, and its position may be adjusted lengthwise in relation to the fender flap through the use of the elongated slots 21. The flap 13 may, of course, be attached to the arm 20 at either the front or back.

The clamp 14 comprises two opposed jaws 25, which are exactly alike and therefore interchangeable, and which are preferably made from sheet metal by stamping into U-form. However, if desired, the two jaws could be made in solid or cast form. Each of the jaws 25 has a rear curved wall 26 and a pair of flat parallel side walls 27 and 28, which are exactly alike except for locking conformations to be described. The upper section 30 of these side walls 27 and 28 presents straight fender clamping edges 31 parallel to the generatrices of the rear wall 26, and one of the jaws 25 has its clamping edges 31 covered with cushioning material by means of a sleeve 32 of resilient or yieldable material, such as rubber, fitted tightly over the upper fender clamping part of the jaw. The jaw 25 which is so covered with the protective sleeve 32 is the one which engages the outer finished face of the side wall 11 of the fender 10 to protect said face against scratches or other defacements.

The lower section 33 of the side walls 27 and 28 of each jaw 25 has a pair of fingers 34 and 35, which are alike except for locking conformations to be described. These fingers 34 and 35 are circular, except where they merge into the body of the side walls 27 and 28 of the jaw 25 and jut forwardly of the fender clamping edges 31 in the upper part 30 of the side walls, to permit the fingers of one jaw to overlappingly engage and register with the fingers on the other jaw and to permit a finger of each jaw to extend between the fingers of the other jaw, so that each jaw will have an inner finger on the inside of the clamp unit 14 and an outer finger on the outside of the clamp unit. A spacer sleeve 36 extends inside the clamp unit 14 between the inner finger 35 of one jaw 25 and the inner finger 35 of the other jaw, and a locking mounting pivot pin 37 in the form of a bolt passes through registering holes 38 in the interengaging overlapping fingers and through the spacer sleeve 36 and also through a hole 39 at the outer end of the fender flap supporting arm 20. This pivot bolt 37 has a head 40 at one end bearing against the outer finger 34 of one jaw 25, and a nut 41 threaded on the other end of the bolt 37 and bearing against the supporting arm 20 to hold the clamp unit 14 onto said arm. Although this nut 41 is shown of the square standard type, it may be in the form of a wing nut to facilitate manipulation without the use of a tool.

The upper section 30 and the lower section 33 of each jaw side wall 27 and 28 are separated by a recess 42 to receive the lower lip of a standard type of fender, as will be more fully described.

For pressing the jaws 25 together with clamping pressure on the fender 10, there is provided a long pin 43 in the form of a bolt passing through holes 44 in the rear walls 26 of the jaws. The holes 44 in these rear jaw walls 26 are desirably elongated along the length of the jaws 25 to allow for limited angular spreading of the jaws about the pivot bolt 37, without removing the bolt 43, in the operation of attaching the clamp device to the fender 10. A nut 45 threaded onto the outer end of the bolt 43 retains the jaws 25 in clamped position on the fender. This nut 45 is desirably in the form of a wing nut to facilitate mounting manipulation without the use of a tool.

The clamp unit 14 may be adjusted about the axis of the pivot bolt 37 to any desired angle in relation to the supporting arm 20, when the nut 41 on said pivot bolt is loose, and is locked in adjusted position when the nut is tightened on said pivot bolt. To assure effective locking of the clamp unit 14 in adjusted position upon the mere tightening of the nut 41 on the pivot bolt 37, the outer end of the supporting arm 20 on that face thereof against which the outer face of an outer finger 34 of the clamp unit 14 bears, has locking conformations 48 radiating from the hole 39 on said arm, and the outer face of this finger in contact with said arm has locking conformations 50 radiating from the hole 38 on said finger and complementing said locking conformations 48 to mesh in interlocking relationship therewith. In the specific embodiment shown, the locking conformations 48 in the supporting arm 20 are in the form of grooves equally spaced and extending radially from the hole 39 in said arm and the locking conformations 50 on the jaw finger 34 in contact with said arm are in the form of ribs extending radially from the hole 38 in said finger and spaced to conform with the spacing of said grooves. The grooves 48 on the supporting arm 20 are desirably formed by stamping with an appropriate die on said arm. The ribs 50 on the jaw finger 34 in contact with the arm 20 are also produced by stamping with an appropriate die. These ribs 50 on the outer face of the finger 34 in contact with the arm 20 are produced by stamping grooves 52 on the inner face of the finger and causing thereby the metal in said finger to project from its outer face in the form of ribs. These ribs 50 are stamped in the finger 34, while the jaw blank is still flat.

The number of locking conformations 48 and 50 is such as to afford adjustments of the clamp unit on the supporting arm 20 in small angular increments, and the number of these conformations would vary to meet a particular design application. In the specific embodiment illustrated, the number of locking conformations 48 is twenty-four, and the number of locking conformations 50, of course, would be the same, allowing thereby the clamp unit 14 to be adjusted into any one of twenty-four angular positions. In adjusting the clamping unit 14 into desired angular position in relation to the arm 20, the nut 41 on the bolt 37 is loosened sufficiently to permit the clamp unit 14 to be turned about said bolt, while retaining sufficient tightness on said nut so as to be able to feel the snapping of the ribs 50 on the finger 34 in contact with the supporting arm 20 into the grooves 48, as the clamp unit is turned. In that way, the proper intermesh of the two sets of locking conformations 48 and 50 is assured. With the two sets of locking conformations 48 and 50 so related, and the nut 41 fully tightened on the bolt 37, the clamp unit 14 will be positively locked to the arm 20 against rotation. In this connection, the sleeve 36 serves not only as a spacer to prevent the two jaws 25 from moving relatively toward each other along the bolt 37, but also as a platen against which the nut 41 bears through the pair of adjoining overlapping fingers 34 and 35, to lock the clamp unit 14 to the arm 20 against rotation, without distorting the jaws.

In lieu of the sleeve 36, the bolt 37 could be shouldered at one end to prevent separation of the adjacent overlapping fingers 34 and 35 when the nut 41 is tightened up.

As previously indicated, the two jaws 25 of the clamp unit 14 are exactly alike to permit interchangeability. With this construction, it is not necessary during assembly, to determine whether or not a jaw 25 belongs on the right or lefthand side of the unit, since either jaw can be used on either side. The jaws 25 have two corresponding fingers 34 respectively with locking conformations 50 on their outer faces, while the other two fingers 35 on the jaws have no such conformations but are plain. In assembly, the two jaws 25 are placed in confronting relationship with their fingers 34 and 35 in overlapping relationship, and with the fingers 34 carrying the locking conformations 50 on the outside. The fingers 35 with no locking conformation will be on the inside of the clamp unit 14 with their smooth surfaces in contact with the inner recessed sides of the fingers 34 carrying the locking conformations 50, so that the two jaws 25 can be moved angularly about the bolt 37, without resistance from said conformations, in the process of fitting the clamp unit 14 onto a fender and tightening the bolt 43 for firm attachment to the fender. In assembled position of the clamp unit 14 as described, since locking conformations 50 are presented on both outer sides of the unit, either side of the unit may be placed in contact with the locking conformations 48 on the end of the supporting arm 20.

Figs. 2 and 3 show the manner in which the clamp 14 and the fender flap 13 can be attached to and supported from one standard type of fender 10. In this type, the side wall section 11 of the fender is vertical and the inturned flange 12 is of substantial width and of wide curvature. For this type of fender, the arm 20 is set horizontal with respect to the fender flap 13 and the clamp 14 is set in upright position to cause the flange 12 to extend easily into the recesses 42 on the side walls 27 and 28 of one of the jaws 25.

By proper adjustment of the angle of the clamp unit 14 in relation to the supporting arm 20, and by proper adjustment of the arm lengthwise and angularly in relation to the fender flap 13, the clamp unit can be easily attached to different standard types of fenders, while attaining the desired positioning of the fender flap in relation to the ground and to the adjoining wheel of the car. The clamp unit 14 may, for example, be attached (in addition to the type of fender shown in Figs. 2 and 3) to a fender in which the side wall section is substantially vertical and in which the inturned flange along its lower edge is comparatively narrow; to a fender in which the side wall section is substantially vertical and in which the inturned flange along its lower edge is comparatively wide; to a fender in which the side wall section is substantially vertical and in which the inturned flange along its lower edge is in the form of a rolled bead; and to a fender in which the side wall section is not vertical and in which the inturned flange along its lower edge is comparatively wide. U. S. Patent No. 2,617,662 illustrates different standard types of fenders and the clamp device of the present invention is adaptable for attachment to these different types of fenders and to many more.

In Figs. 9 and 10 is shown a modified form of protective device 32$^a$ to take the place of the protective sleeve 32 in the construction of Figs. 1 to 8. In this modified construction, the protective device 32$^a$ is in the form of a block of resilient or cushioning material such as rubber, having a body section 55 adapted to fit snugly with a friction fit into the space between the side walls 27 and 28 of that jaw 25, which engages the outer finished face of the side wall 11 of the fender 10 in attached position of the clamp device, and an outer flange 56, which seats against the clamping edges 31 of said jaw and serves to prevent direct contact of said clamping edges with said fender face. The insert body 55 desirably has side grooves 57 to define an inner flange 58 which can flex into tight friction contact with the inner faces of the side walls 27 and 28 of the jaw 25. The friction engagement between the insert 32$^a$ and the side walls 27 and 28 is loose enough to permit the insert to be fitted easily between said side walls but tight enough to retain the insert firmly in position between said walls.

It should be noted that the insert 32$^a$ is of such shape, that it can be made easily by the extrusion process. The resulting continuous ribbon produced thereby can be cut into sections to form the individual inserts 32$^a$.

While the invention has been described with particular reference to a specific embodiment, it is to be understood that it is not to be limited thereto, but is to be construed broadly and restricted solely by the scope of the appended claims.

What is claimed is:

1. A device for supporting a fender flap from the fender of a car, comprising a clamp adapted to be fastened to the fender and including a pair of opposed jaws exactly alike and interchangeable, each of said jaws being made from a metal sheet bent into U-shape to present near one end clamping edges for bearing against a face of a fender wall, each of said jaws presenting near the opposite end a pair of fingers, the two jaws being disposed opposite each other with the fingers of the two jaws in overlapping engagement, each of said jaws intermediate its ends being formed with a recess to receive the differently shaped lower edge sections of fenders of standard makes, a fastening pin passing through said fingers to hold said jaws together while permitting said jaws to have relative angular movement about the axis of said pin, an arm for supporting a fender flap having a hole to receive said pin, whereby said clamp may be mounted on said arm, said clamp being angularly adjustable as a unit about the axis of said pin in relation to said arm, means including said pin for securing said clamp to said arm in adjusted position against angular movement as a unit about said axis, and means for releasably clamping said jaws to opposite faces of a fender wall comprising a bolt passing through the two jaws in a direction transverse to said pin.

2. A device for supporting a fender flap from the fender of a car, comprising a clamp adapted to be fastened to the fender, and including a pair of opposed jaws having respective overlapping sections in face to face contact an arm for supporting the fender flap, and means for supporting said clamp on said arm for angular adjustment about a fixed axis on said arm, and for locking said clamp to said arm in any angular adjusted position of said clamp, and comprising a fastening pin passing through said arm and through the overlapping sections of said clamp, one of said overlapping sections and said arm having respective parts coming into face to face contact upon the tightening of said fastening pin, the confronting faces of said parts having locking conformations adapted to mesh and interlock when said fastening pin is tightened to prevent rotation of said clamp about the axis of said pin in respect to said arm.

3. A device for supporting a fender flap from the fender of a car as described in claim 2, wherein said locking conformations comprise a series of grooves on the confronting face of one part, and a series of corresponding ribs on the confronting face of the other part.

4. A device for supporting a fender flap from the fender of a car as described in claim 2, wherein said locking conformations comprise a series of grooves on the confronting face of one part radiating from said fastening pin, and a series of corresponding ribs on the confronting face of the other part radiating from said fastening pin.

5. A device for supporting a fender flap from the fender of a car, comprising an arm for supporting the fender flap, a clamp adapted to be fastened to the fender and including a pair of opposed jaws, each of said jaws being made from a metal sheet bent into U-shape to present near one end clamping edges for bearing against a face of a fender wall, each of said jaws presenting near the opposite end a pair of fingers, the two jaws being disposed oposite each other with the fingers of the two jaws in overlapping engagement, a fastening pin passing through said fingers to hold said jaws together, while permitting said jaws to have relative angular movement about the axis of said pin, an arm for supporting a fender flap having a hole to receive said pin, whereby said clamp may be mounted on said arm, said clamp being angularly adjustable as a unit about the axis of said pin in relation to said arm, means including said pin for pressing said clamp against said arm to cause the outer finger on one side of said clamp to bear against a face of said arm, and to secure thereby said clamp to said arm in adjusted position against angular movement as a unit about said axis, the face of said arm and the face of said outer finger having positive interlocking conformations preventing relative movement between said clamp and said arm, when said clamp is pressed against said arm, and means for releasably clamping said jaws to opposite faces of a fender wall.

6. A device for supporting a fender flap from the fender of a car as described in claim 5, wherein the locking conformations on one of said faces are in the form of grooves radiating from said pin, and the locking conformations on the other face are in the form of corresponding ribs radiating from said pin and extending into said grooves respectively.

7. A device for supporting a fender flap from the fender of a car as described in claim 5, wherein said jaws are exactly alike to render them interchangeable, and each of said jaws has a finger on the outer side of the clamp with locking conformations on its outer face extending radially from the pin passing therethrough and the locking conformations on the face of said arm similarly extend radially from the pin.

8. A device for supporting a fender flap from the fender of a car, comprising a clamp adapted to be fastened to the fender and including a pair of opposed jaws, each made from a metal sheet bent into U-shape to present near one end clamping edges for bearing against a face of a fender wall, each of said jaws presenting near the opposite end a pair of fingers, the two jaws being disposed opposite each other with the fingers of the two jaws in overlapping engagement, a sleeve between the inner fingers of the jaws engaging said inner fingers, a fastening pin passing through said fingers and through said sleeve to hold said jaws together while permitting said jaws to have relative angular movement about the axis of said pin, an arm for supporting a fender flap having a hole to receive said pin, whereby said clamp may be mounted on said arm, said clamp being angularly adjustable as a unit about the axis of said pin in relation to said arm, means including said pin for securing said clamp to said arm in adjusted position against angular movement as a unit about said axis, and means for releasably clamping said jaws to opposite faces of a fender wall.

9. A device for supporting a fender flap from the fender of a car, comprising a clamp adapted to be fastened to the fender and including a pair of opposed jaws angularly movable relatively towards and away from each other and defining clamping sections for engaging the opposite faces of a fender wall, one of said jaws having a pair of side walls defining respective clamping edges, means for fastening the clamp to the fender flap, and a protective insert of cushioning material adapted to fit frictionally between said side walls and having an outer flange adapted to seat against said clamping edges to prevent the surface of the fender to which said clamp is attached from being defaced by said clamping edges.

10. A device for supporting a fender flap as defined in claim 9, wherein said insert has a body section adapted to fit frictionally between said side walls and having side grooves to define an inner flange for friction engagement with said side walls.

11. A device for supporting a fender flap from the fender of a car, comprising a clamp adapted to be fastened to the fender and including a pair of opposed jaws angularly movable relatively towards and from each other and defining respective clamping sections for engaging the opposite faces of a fender wall, one of said jaws having a pair of side walls defining respective clamping edges, an arm for supporting the fender flap, pivot means supporting the clamp on said arm for angular adjustment as a unit about a fixed axis on said arm, and a protective insert of cushioning material fitted frictionally between said side walls and having an outer flange seated against said clamping edges to prevent the surface of the fender to which said clamp is attached from being defaced by said clamping edges.

References Cited in the file of this patent
UNITED STATES PATENTS

| | | |
|---|---|---|
| 1,114,921 | Selstad | Oct. 27, 1914 |
| 1,294,518 | Mowry | Feb. 18, 1919 |
| 1,385,946 | Heider | July 26, 1921 |
| 2,084,087 | Jackson | June 15, 1937 |
| 2,585,397 | McCollum | Feb. 12, 1952 |
| 2,593,179 | Price et al. | Apr. 15, 1952 |
| 2,617,662 | Jackson | Nov. 11, 1952 |